UNITED STATES PATENT OFFICE.

JUSTIN KAY TOLES, OF SAN FRANCISCO, CALIFORNIA, ASSIGNOR TO UNION FIBRE COMPANY, OF WINONA, MINNESOTA, A CORPORATION OF MINNESOTA.

PROCESS FOR PRODUCING FIBROUS MATERIAL FROM RICE-STRAW.

1,235,258. Specification of Letters Patent. Patented July 31, 1917.

No Drawing. Application filed March 1, 1915, Serial No. 11,378. Renewed June 15, 1917. Serial No. 175,039.

*To all whom it may concern:*

Be it known that I, JUSTIN KAY TOLES, a citizen of the United States of America, residing at San Francisco, county of San Francisco, State of California, have invented a certain new and useful Process for Producing Fibrous Material from Rice-Straw; and I do hereby declare the following to be a full, clear, and exact description of the invention, such as will enable others skilled in the art to which it appertains to make and use the same.

This invention relates to a novel and improved process for producing fibrous material from rice straw.

At present no use is made of rice straw though many unsuccessful attempts have heretofore been made to treat and prepare it for practical use and commercial purposes. Annually in the States of California, Texas and Louisiana—not to mention other parts of the United States—hundreds of thousands of tons of rice straw are wasted or destroyed, usually by burning, solely because the rice straw cannot be marketed before the invention of some means or process whereby the rice straw can be treated to change its state or condition so that it can be utilized practically and commercially. Heretofore straw-board, wall-board, refrigerator felt, insulating lining, roofing-material, etc., has been made of materials combined with a material, such as flax straw, which latter furnishes the fibers that naturally bind together and act as a bond for the other materials. Besides other objections to the use of flax straw as just stated, are the highly absorbent nature of the flax fiber and its expense which narrows its field for application commercially in competition with other products.

The main object of this invention is to provide an alkaline or novel and improved process whereby it becomes possible to fiberize and thus utilize the cheap and abundant supply of rice straw which now is wasted and has little or no commercial value.

In carrying out the process the rice straw is placed in a caustic solution preferably consisting approximately of two parts of lye, one part of permanganate of potash, and one hundred parts of water. The rice straw in the solution is boiled from one-half to one hour, in order to break down or destroy the refractory substances which enshroud the fibers of the rice straw; after which the rice straw is freed of the solution, preferably by passing it through squeeze rollers, and then it is washed in water, preferably boiling; after which it is given a bath in a two per cent.—approximate—sulfuric acid solution to neutralize any part of the solution still remaining thereon. Then it is freed from the acid solution, preferably by passing it through squeeze rollers, and placed in a solution of suitable strength of any commercial oxid, such as alumina hydroxid, oxid of iron, or any of the chromic oxids, after which it is freed of the last solution, preferably by squeezing and washing it in water. The reactive acid oxid bath fixes and strengthens the fibers and preserves them against further attack by atmospheric oxids.

This process disintegrates the rice straw to its fibrous constituents and produces from the rice straw a fibrous material in which the fibers are not only light in weight, but they are also strong, flexible, highly resistant to moisture, and have excellent binding and felting qualities.

The fibrous material produced by the above process constitutes a cheap commercial product which is adapted to be mixed or combined with other ingredients or materials—under pressure, and heat in some cases—as a basis to form various commercial products, such as straw-board, linoleum, wall-board, panels, refrigerator felt, insulating or sound deadening lining, roofing material, tiles, etc.

The process which has been particularly described admits of substitutions and variations of ingredients and operations, wherefore the right is reserved to all such substitutions and variations of ingredients and operations as are the equivalent of those which are mentioned in the appended claims.

I claim:

1. A process for fiberizing rice straw, which consists in first boiling the rice straw in an alkaline solution in order to break down the substances which enshroud the fibers of the rice straw, then washing it in water, then giving it a bath in an acid solution, and then subjecting it to the action of a solution of any commercial oxid.

2. A process for producing fibrous material from rice straw, which consists in first boiling the rice straw in a solution of lye, permanganate of potash, and water, then washing the rice straw in water, then giving the rice straw a bath in an acid solution, and then subjecting the rice straw to the action of a solution of any commercial oxid.

3. The herein-described process for producing fibrous material from rice straw, which consists in boiling the rice straw in a solution consisting approximately of two parts of potash, one part of permanganate of potassium, and one hundred parts of water, said boiling to continue from one half to one hour according to the strength of said solution after which the rice straw is freed from said solution and washed in boiling water, then the rice straw is given a bath in a two per cent.—approximate—acid solution, after which the rice straw is freed from the last mentioned solution and placed in a solution of suitable strength of any commercial oxid, and then freed from the last mentioned solution.

In testimony whereof, I have signed my name to this specification in the presence of two subscribing witnesses at San Francisco, county of San Francisco, State of California, this 18th day of February, A. D. 1915.

JUSTIN KAY TOLES.

Witnesses:
W. T. HESS,
A. H. LIDDERS.